United States Patent [19]

Hisken et al.

[11] Patent Number: 4,786,205
[45] Date of Patent: Nov. 22, 1988

[54] ENVIRONMENTAL WATER CONSERVATION METHOD AND APPARATUS

[76] Inventors: Dan E. Hisken, 1517 Yolo, Corning, Calif. 96021; Ed Stricker, 1237 Aloha, Red Bluff, Calif. 96080

[21] Appl. No.: 419,062

[22] Filed: Sep. 16, 1982

[51] Int. Cl.⁴ .................... E02B 1/00; B65G 5/00; A01K 7/00
[52] U.S. Cl. ................... 405/52; 119/72; 405/53; 405/270
[58] Field of Search ..................... 405/52-58, 405/270; 220/216, 218, 219, 220; 119/61-63, 73, 72; 202/234

[56] References Cited

U.S. PATENT DOCUMENTS

| | | | |
|---|---|---|---|
| 1,267,434 | 5/1918 | MacPherson | 220/216 |
| 1,752,197 | 3/1930 | Patterson | 220/216 |
| 2,919,047 | 12/1959 | Fino | 220/219 |
| 3,150,639 | 9/1964 | Sereda | 119/73 X |
| 3,336,206 | 8/1967 | Sasaki et al. | 202/234 |
| 3,517,513 | 6/1970 | Renshaw et al. | 405/52 |
| 3,559,408 | 2/1971 | Earnhart | 405/52 |
| 3,991,900 | 11/1976 | Burke et al. | 220/219 |
| 4,286,546 | 9/1981 | Moore | 119/72 X |
| 4,343,264 | 8/1982 | Schafer et al. | 119/73 |

FOREIGN PATENT DOCUMENTS 691185 5/1953 United Kingdom ................ 220/216

*Primary Examiner*—David H. Corbin
*Attorney, Agent, or Firm*—Herbert C. Schulze

[57] ABSTRACT

This is a method and apparatus for the collection and utilization of environmental water in remote locations wherein the invention features the utilization of dome-protected water collection reservoirs suitable to collect rain in major or minor amounts, evaporative moistures such as dew, fog and the like. The invention is characterized by the utilization of a trough-like member having a dome-like cover to prevent undue evaporation and wherein the dome cover is provided with access ports such that animals can obtain water from the collected water. Alternately, the dome covering may be omitted and a conduit provided from the trough to another non-evaporative container.

6 Claims, 2 Drawing Sheets

U.S. Patent  Nov. 22, 1988  Sheet 1 of 2  4,786,205
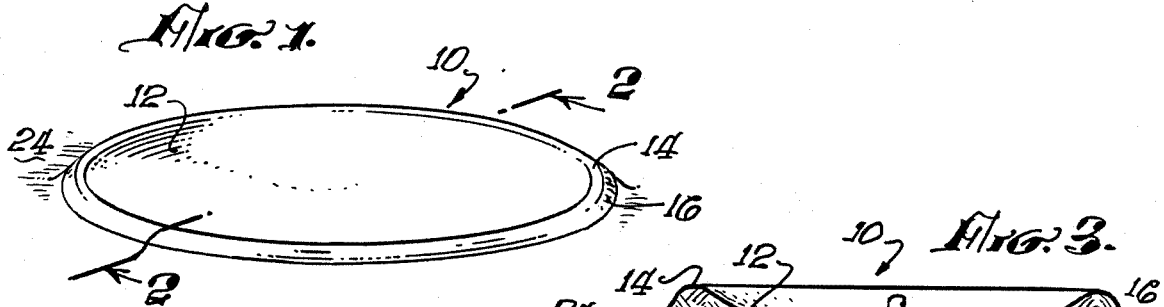
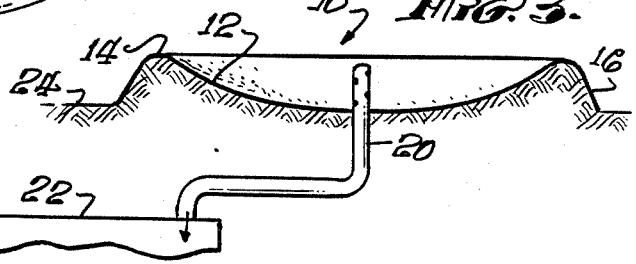
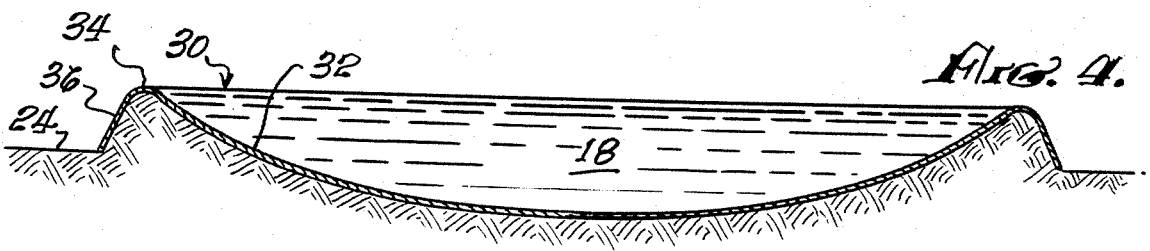
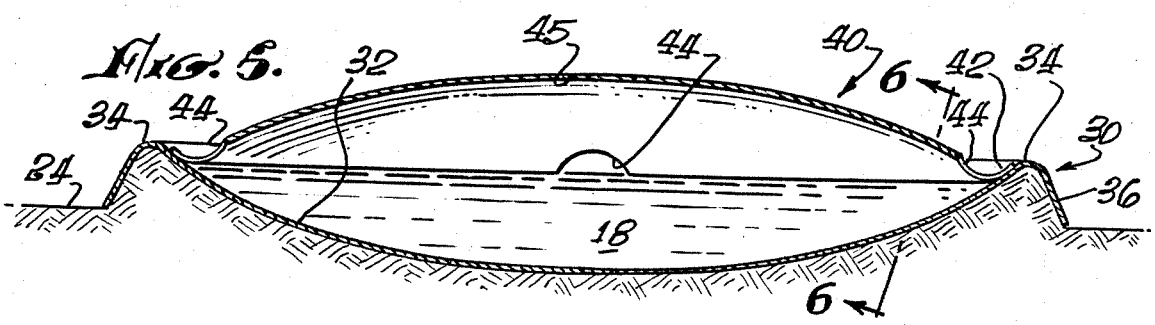
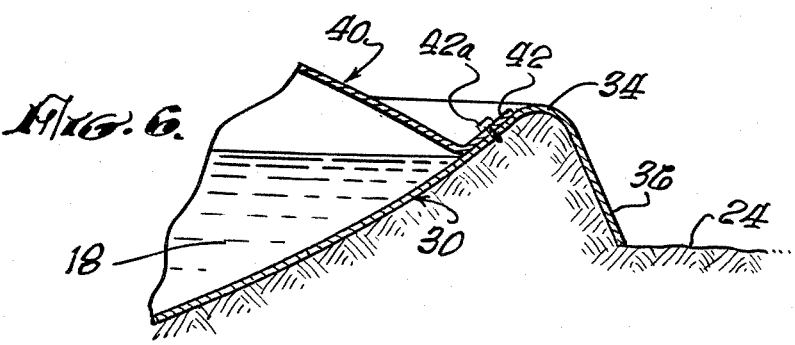

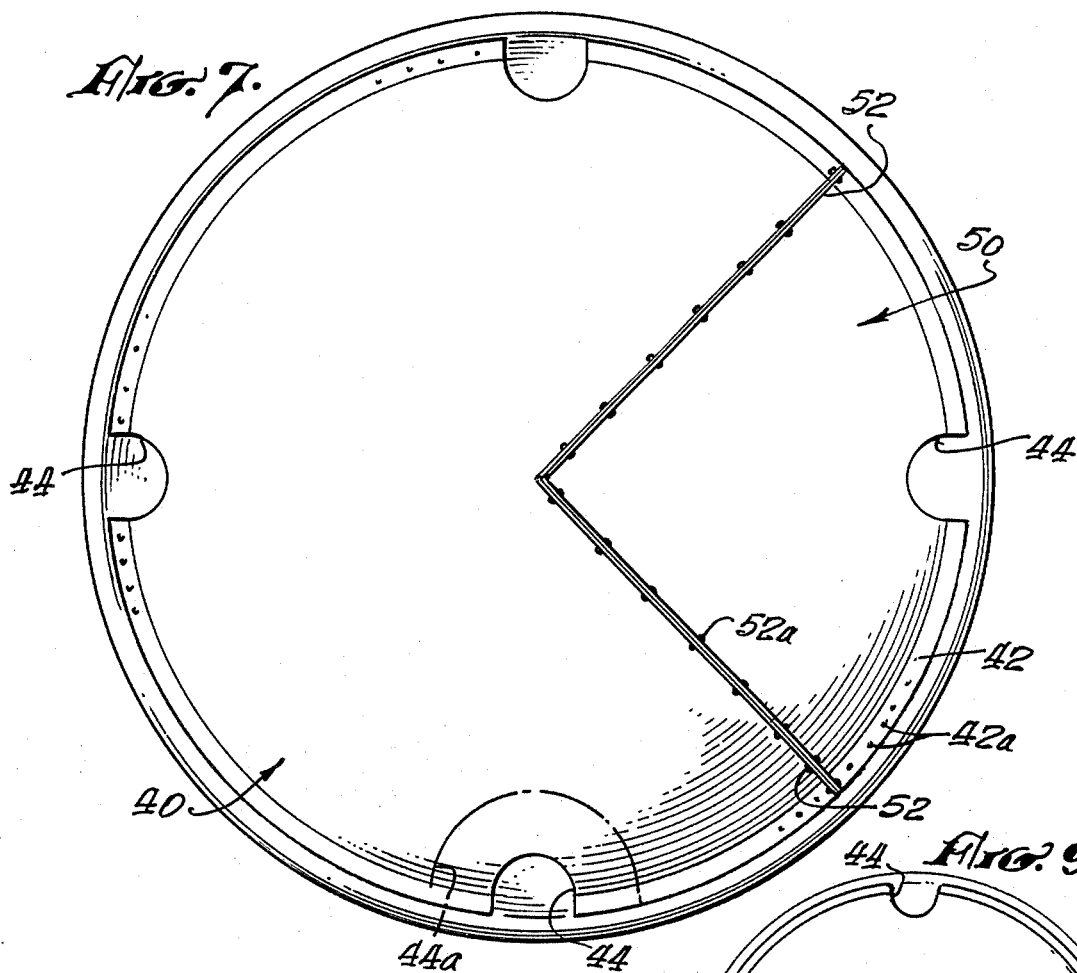
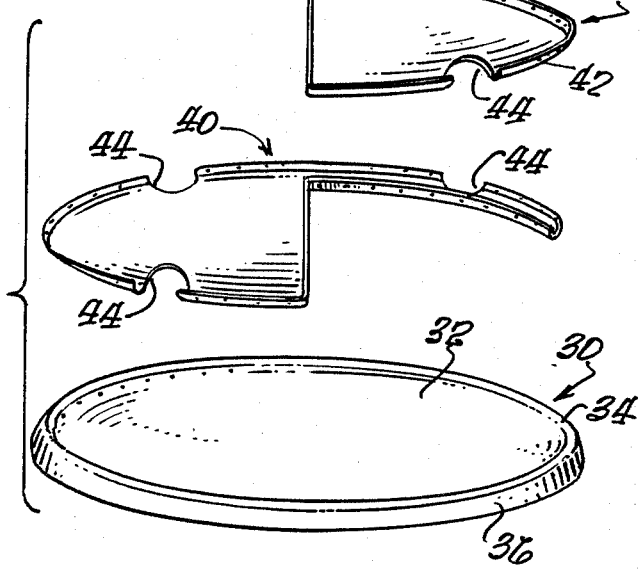
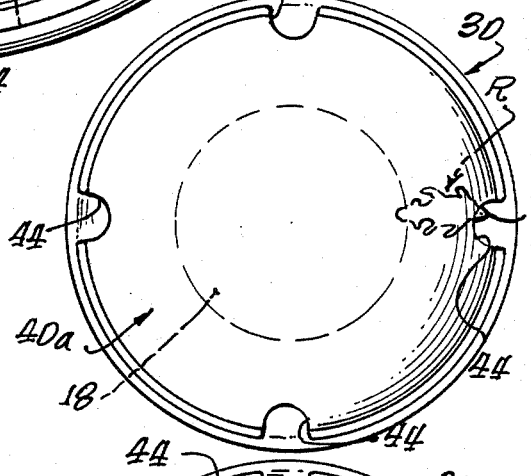
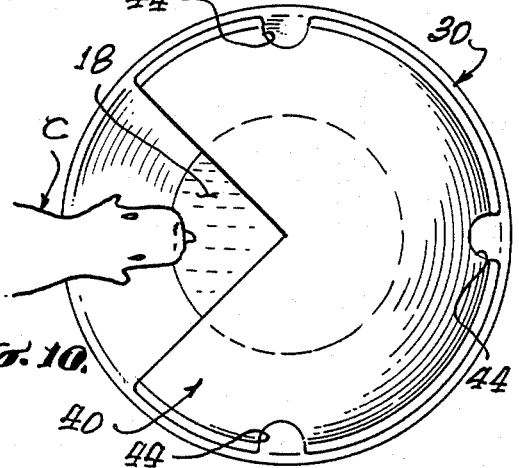

ENVIRONMENTAL WATER CONSERVATION METHOD AND APPARATUS

CROSS REFERENCE TO RELATED PATENT APPLICATIONS

There are no patent applications filed by us related to the present application with the exception of the design patent application being filed concurrently herewith entitled ENVIRONMENTAL WATER CONSERVATION CISTERN.

BACKGROUND OF THE INVENTION

1. Field of the Invention

This invention is in the general field of collection of water in remote areas. It is more particularly directed to a method and apparatus for collection of large and small amounts in pre-formed, transportable collection devices. The invention is further directed to such collection devices and methods for use wherein evaporation-deterring means are provided in conjunction with the water reservoir means and wherein means are provided in connection therewith to allow animals to have access for the purpose of obtaining drinking water.

2. Description of the Prior Art

In the past, it has sometimes been attempted to provide catch basins for rain, and the like, in remote areas by digging holes, or depressions into the earth in which water, particularly from rains, will collect. Such catch basins are beneficial, but can not be used in all locations, and generally create an extremely muddy unreliable source of water in remote areas. Further, the cost is frequently prohibitive. The present invention has nothing in common with such prior art in that basins are formed of fiberglass reinforced resins, or the like, of such shape and dimensions that water can be contained within them. Associated means, preferably dome means, prevent excessive evaporation and provide access for small animals, and the like, to obtain drinking water. These devices are transportable to remote areas and may be placed in locations where catch basins cannot even be provided such as rocky areas, and the like. Thus, there is no prior art applicable to this invention known to us.

SUMMARY OF THE INVENTION

There are many remote areas, particularly in rocky, arid, and other situations, where it is virtually impossible to store water from rains, fog, other natural moisture, and the like, for the use of local environmental purposes such as for drinking purposes for small animals living in the area. Where these conditions exist attempts are frequently made to provide catch basins by digging small ponds, and the like. Such does not provide a satisfactory answer since such arrangements result in muddy and dirty water with high evaporation rates and a large amount of loss by seepage into the ground.

We have studied this problem and have developed a method and apparatus by which natural moisture including rain, fog, dew, and the like, can be successfully trapped and held against any excessive evaporation for the use small animals in the area or for other uses that may be desired.

We have accomplished the ends and desires by providing a large bowl-like reservoir with an associated dome-like cover such that rain, condensed fog, dew, and the like, or other moisture occurring in the area will drain off of the exterior of the dome and into the bowl-like reservoir. The dome substantially covering the reservoir prevents evaporation in that evaporation that takes place is stopped on the inside of the dome and collected on the inside of the dome from which position it drains back into the reservoir. Likewise, in a dew, rain, or other moisture, will be collected on the exterior of the dome and drain downward. A number of suitable sized openings are provided in the dome adjacent the water-containing reservoir so that the water will drain through those openings into the reservoir. These openings also provide access for small animals to enter and drink the water in the container.

One particularly unusual and unexpected result obtained by this combination is that the dome-like covering will provide an unusually fine surface for condensation of moisture in the air at night. It becomes naturally cool on its exterior surface by reason of the return of any entrapped vapor within the dome and thus enhances condensation and collection of moisture.

As one alternate embodiment, we have provided the collection reservoir with a discharge means in its center wherein the moisture or water is discharged to another cistern, or the like, for retention. When used in this form, collection may be either with or without the dome protector.

In further alternate embodiments, the dome-like may be made in segments which may be removed as might be required to allow large animals such as deer, bear, and the like, to drink from the reservoir.

In general throughout this specification we shall show essentially round, bowl-shaped collecting reservoir and essentially round, dome-shaped cover. It is to be understood that if for some reason it was desired, an elongated reservoir such as an oval, rectangular, or other suitably shaped container could be used with an appropriately shaped elevated cover. However, the most effective is in the round shape.

It is an object of this invention to provide a method and apparatus as outlined and as further described in this application for the purpose of collecting naturally occurring water in remote areas.

Another object of this invention is to provide such a method and apparatus for collecting water as has been set forth wherein access is provided wherein animals may drink from the water so collected.

Another object of this invention is to provide a method and apparatus for enhancing the collection of naturally occurring moisture in remote areas and storing it for use for local animal life, and the like.

The foregoing and other objects and advantages of this invention will be apparent to those skilled in the art upon reading the description of a preferred embodiment which follows, in conjunction of a review of the appended drawings.

BRIEF DESCRIPTION OF THE DRAWINGS

FIG. 1 is a perspective view of a bowl-like cistern for the collection and retention of naturally occurring moisture;

FIG. 2 is an enlarged section as viewed on line 2—2 of FIG. 1;

FIG. 3 is an alternate embodiment of the device of FIG. 1;

FIG. 4 is a preferred construction of collector cistern showing an alternate construction;

FIG. 5 is a view similar to FIG. 4 but with the cover construction of the invention placed over the device of FIG. 4;

FIG. 6 is an enlarged section fragmentarily showing the construction of the device of FIG. 5 as viewed on line 6—6 of FIG. 5;

FIG. 7 is a top plan view of FIG. 5;

FIG. 8 is an exploded view of the device of FIG. 7 showing the various components comprising the assembly;

FIG. 9 is a plan view on a reduced scale showing an alternate embodiment of the device of FIGS. 5 and 7; and FIG. 10 shows a plan view of the device of FIG. 7, but with the segment removed so as to allow access to the interior of the cistern collected water by large animals.

DESCRIPTION OF A PREFERRED EMBODIMENT

In FIG. 1, we have illustrated a perspective of a collecting basin of a configuration that is of our design. The basin, shown at 10, is formed with a bowl-like area 12 terminating in a smoothly contoured edge portion 14. The form shown in FIG. 1 is of a circular configuration, although it is to be understood that such variations as ovals, and the like, can be constructed.

sloping side wall at 16 allows the overflow of collected water in the bowl area 12 directs such overflow onto the ground surface 24 without erosion, and the like.

Water 18 is shown having filled the basin as illustrated in the section of FIG. 2. This water is retained for the purposes of providing water for animals, and the like, and for other purposes such as a body of water that can be used by hydro-electric generators when such water is critical during low levels of flowing water and can also be used as a container for keeping water for emergency supply as for fire fighting when such need becomes necessary. Irrigation water is also stored.

In FIG. 3 we have shown the cistern collector unit as being constructed from a layer of material such as fiberglass, plastic, metal, or any other suitable material that can be transported to the site or manufactured on the site for the water collecting job a drainpipe 20 can be used to direct excess water to an holding cistern, or the like, 22.

In the section of FIG. 5, we have provided the container 30, which is made in the manner described, with a suitable cover assembly 40. This cover rests on the bowl portion 32 of the container 30 and is located within the outer overflow edge 34 as shown. The sloping walls 36 allow any overflow to pour onto the ground 24 with eroding any of the surrounding area.

The dome-like cover 40 is provided with openings 44 which allow any water falling onto the top of the dome 45 to drain into the lower container 30. A peripheral edge 42 is shown fastened by fasteners 42a to the wall 32. It is to be understood that there are many known methods of fastening various materials to one another, and in this particular case, we have shown small screws, or the like, as being the cohesive means.

The top plan view of FIG. 7 illustrates a cover assembly 40 which is provided with a removable segment 50. This segment can become part of the overall construction of the dome and have its own opening 44, or it can be removed as shown in FIGS. 8 and 10 in order to provide access into the interior of the collector assembly for purposes of cleaning or for the mentioned purpose of allowing larger animals to have access to the collected water.

In FIGS. 7 and 8 an edge 52 of each side of the segment is shown as being capable of being fastened to the rest of the dome 40 by fasteners 52a. A desired opening of a size that may be larger than the preformed openings 44 can be formed as shown by the phantom line indication at 44a. This is provided that the material comprising the segment or the dome is of a nature that can be easily cut out.

The plan view of FIG. 9 shows a cover 40a which does not have the segment incorporated therewith as shown in FIGS. 7 and 8 The small animals as shown at R can either drink the water at the very opening itself, if the cistern is full, or can crawl down into the cistern to a point, as shown by the dotted circle in FIGS. 9 and 10, deeper into the bowl-like collector in order to drink.

In FIG. 10, a cow C is shown utilizing the removed larger segment of FIGS. 7 and 8 and is shown being able to drink from the collector even with a low supply of collected water.

It can be seen that there are several variations of construction in the design of the cistern, and it is to be understood that the cover can be designed to accommodate the desired size access opening and the desired number of removable panels. In fact, during the construction and transportation of the components of the collector assembly, it may be more desirable to transport the assembly in disassembled condition and have the dome in many segments. The lower bowl can be in segments, also.

While we have shown embodiments of this invention and have described the methods that are fully capable of achieving the objects and the advantages desired, it is to be understood that such embodiments are for the purpose of illustration only and not for the purpose of limitation.

We claim:

1. The method of collecting locally and naturally occurring water from the atmosphere which comprises: placing a water storage container having a upper rim in a remote area; partially covering said water storage container with a removable impervious, segmented elevated cover; attached to said rim providing means associated with said cover for diverting naturally occurring moisture into the container; and providing means for access to water within said container by animals 2. The method of claim 1 wherein water from the interior of said container is caused to become a vapor and collect on the interior of said cover resulting in a cooling effect on said cover.

3. The method of claim 2 wherein access to the water in said container is provided by removing a segment of said segmented cover.

4. Apparatus for gathering naturally occurring moisture from the atmosphere in remote areas comprising: bowl-like container means; dome-like cover means containing inlet means suitable for entry of atmospheric water covering the container means, said dome-like cover means being provided with means through which animals may have access; and, means cooperative with said bowl-like container means and dome-like cover for fastening bowl-like container means and dome-like cover means together adjacent their peripheral edges.

5. The apparatus as set forth in claim 4 wherein said bowl-like container means is provided with an overflow contoured peripheral means for controllably allowing the overflow of water gathered within said bowl-like container means in such a manner as not to erode surrounding ground surfaces.

6. The apparatus as set forth in claim 5 wherein said dome-like cover means is provided with a removable pre shaped segment means of said dome-like cover means for the purpose of access to said bowl-like container means for the cleaning out of debris and for the purpose of providing access to the water by larger animals.

* * * * *